United States Patent

Neubold

[11] Patent Number: 5,374,028
[45] Date of Patent: Dec. 20, 1994

[54] QUICK-ACTION FLAP

[75] Inventor: Michael Neubold, Wirnsheim, Germany

[73] Assignee: ABB Management AG, Baden, Switzerland

[21] Appl. No.: 181,424

[22] Filed: Jan. 14, 1994

[30] Foreign Application Priority Data

Jan. 30, 1993 [DE] Germany ............... 4302666

[51] Int. Cl.⁵ .................. F16K 1/20; F16K 25/00
[52] U.S. Cl. .................... 251/86; 251/159; 251/298; 251/368
[58] Field of Search ............. 251/86, 88, 159, 298, 251/368

[56] References Cited

U.S. PATENT DOCUMENTS

| 1,213,513 | 1/1917 | Lohse | 251/158 |
|---|---|---|---|
| 1,850,094 | 3/1932 | Dean | |
| 2,173,949 | 9/1939 | Neveu | 251/86 |
| 2,556,904 | 6/1951 | Cline et al. | 137/516.29 |
| 3,384,340 | 5/1968 | Fawkes | 251/307 |
| 3,601,364 | 8/1971 | Scaramucci | 251/306 |
| 3,666,234 | 5/1972 | Scaramucci | 251/298 X |
| 3,937,441 | 2/1976 | Baumann | 251/298 |
| 3,963,211 | 6/1976 | Myers | 251/298 X |
| 4,118,008 | 10/1978 | Myers | 251/298 |
| 4,260,129 | 4/1981 | Groenefeld | 251/298 X |
| 4,475,712 | 10/1984 | De Jager | 251/86 X |
| 4,498,492 | 2/1985 | Carpentier | 251/298 X |

FOREIGN PATENT DOCUMENTS

| 0374644A1 | 6/1990 | European Pat. Off. |
|---|---|---|
| 149398 | 11/1902 | Germany |
| 916139 | 8/1954 | Germany |
| 969074 | 4/1958 | Germany |
| 3002597 | 8/1980 | Germany |
| 3541192C1 | 11/1986 | Germany |
| 446702 | 11/1974 | U.S.S.R. |
| 922391 | 4/1982 | U.S.S.R. |
| 1488649 | 6/1989 | U.S.S.R. |
| 1560855 | 4/1990 | U.S.S.R. |
| 1569491 | 6/1990 | U.S.S.R. |

Primary Examiner—John Rivell
Attorney, Agent, or Firm—Burns, Doane, Swecker & Mathis

[57] ABSTRACT

This quick-action flap (1) is provided with a housing body (2), with a service opening (4) let into the housing body (2), with at least two bearing positions (17) for a driven shaft (16), which bearing positions are machined into the housing body (2), and with a flap plate (11) which is fastened on the shaft (16), is pivotable about the center line of the shaft (16) and interacts with a detachable seating ring (10).

The intention is to create a quick-action flap which can be manufactured easily and which is secured particularly well against long-term jamming at comparatively high operating temperatures and pressure loads. This is achieved by the bearing positions (17) being arranged outside the service opening (4) region which causes inhomogeneous stress distributions in the housing body (2).

7 Claims, 4 Drawing Sheets

QUICK-ACTION FLAP

BACKGROUND OF THE INVENTION

1. Field of the Invention

The invention is based on a quick-action flap in accordance with the preamble to claim 1.

2. Discussion of Background

Such quick-action flaps are provided, for example, for the rapid interruption of the steam supply to a turbine of a power station installation. Quick-action flaps of conventional type are known which have housing bodies which are complicated to manufacture. These housing bodies are subjected to comparatively high temperatures.

From the publication EP-A1-0 374 644, a quick-action flap with a flap plate is known which has a housing body with a service opening let into it. The flap plate is fastened to a driven shaft. Two bearing positions, in which the shaft is supported, are machined into the housing body. A seating ring which interacts with the flap plate is let into the housing body so that, when required, the flow of steam through the quick-action flap is interrupted by the flap plate being in contact with the seating ring. In this embodiment, the bearing positions are arranged near the service opening, i.e. in a region of the housing body where the stress distribution is problematic.

Such quick-action flaps must operate very reliably in all operating situations in order to satisfy the high requirements made with respect to operational reliability and dynamics. A quick-action flap of this type is not suitable for higher temperatures because deformation of the housing body cannot then be excluded. If, however, the housing body should distort due to excessive heating and pressure loading, the shaft can jam in the bearing positions so that the flap plate moves too slowly or not at all.

SUMMARY OF THE INVENTION

Accordingly, one object of the invention is to provide help in this respect. The invention, as defined in the independent claims, achieves the object of creating a quick-action flap which can be manufactured easily and which can be secured particularly well against long-term jamming at comparatively high operating temperatures and pressure loads.

The advantages achieved by means of the invention may be seen essentially in the fact that despite the substantially improved operational reliability of the quick-action flap, it is possible to manufacture it cheaply.

The quick-action flap is provided with a housing body, with a service opening let into the housing body, with at least two bearing positions for a driven shaft, which bearing positions are machined into the housing body, and with a flap plate which is fastened on the shaft, is pivotable about the center line of the shaft and interacts with a detachable seating ring. A particularly advantageous effect of this quick-action flap is that the bearing positions are arranged outside the service opening region which causes inhomogeneous stress distributions in the housing body.

It is also advantageous for the housing body of the quick-action flap to have a spherical configuration, therefore making it comparatively easy to manufacture by casting. In addition, the spherical shape is advantageous where a more homogeneous stress distribution has to be achieved.

In addition, it is found to be advantageous, with respect to improved temperature resistance, for the housing body of the quick-action flap to be cast from a heat-resistant martensitic steel with a chromium proportion of approximately 10% and for the seating ring to be manufactured from a similar forgeably configured martensitic steel. The seating ring is positioned by means of at least two pins engaging in recesses in the seating ring. The at least two pins are configured so as to be eccentric in the region in which they protrude into the recesses so that, when the pins are rotated, the seating ring is pressed in one of its axial directions, depending on the particular direction of rotation. This arrangement particularly facilitates the fitting and removal of the seating ring. In addition, it is advantageous for the seating ring to be seated in the housing body by means of a conically configured seat and for this conically figured seat not to be self-locking. The seating surface of the conically configured seat is inclined by an angle $\alpha$ relative to the center line of the seating ring, the angle $\alpha$ being in the range between 20° and 35° but being preferably embodied at 27°.

With respect to a good safety layout of the quick-action flap, it is found to be particularly advantageous for the shaft to be provided in the region between the two bearing positions with a coupling, for example an Oldham disk, which compensates for center line offset and angular differences.

Further embodiments of the invention are the subject matter of the dependent claims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
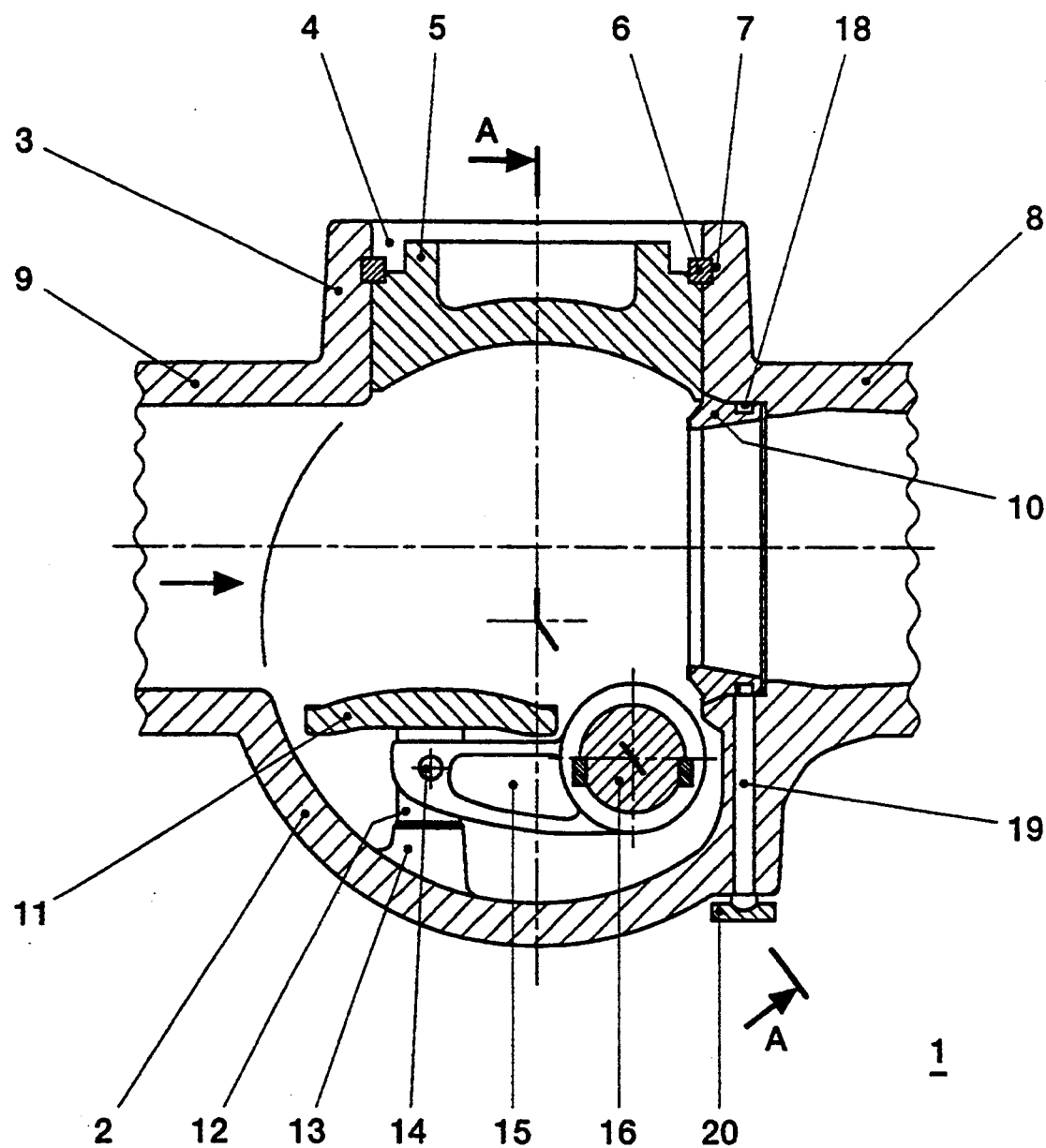
FIG. 1 shows an embodiment of a quick-action flap according to the invention.

Referring now to the drawings, which represent only one possible embodiment, wherein like reference numerals designate identical or corresponding parts throughout the several views, wherein all elements not necessary for direct understanding of the invention are not shown and wherein some flash marks are omitted for improved clarity, FIG. 1 shows a diagrammatic representation of a quick-action flap 1. This quick-action flap 1 has a spherically configured housing body 2 which is provided with a mouthpiece 3 for a service opening 4. The service opening 4 is closed by means of a closing cover 5 matched to the spherical shape of the housing body 2. The closing cover 5 is held by means of a known Brettschneider lock. The Brettschneider lock has, inter alia, a multipart ring 6 which is held in a recess 7, matched to it, of the housing body 2. The guide of the closing cover 5 in the housing body 2 and the seals necessary in this region are not shown. Two connecting mouthpieces 8, 9 are cast onto the housing body 2. The hot steam flows through the connecting mouthpiece 9 into the quick-action flap 1 and when the quick-action flap 1 is open, as is shown here, the hot steam flows out through the connecting mouthpiece 8.

Figure 2:
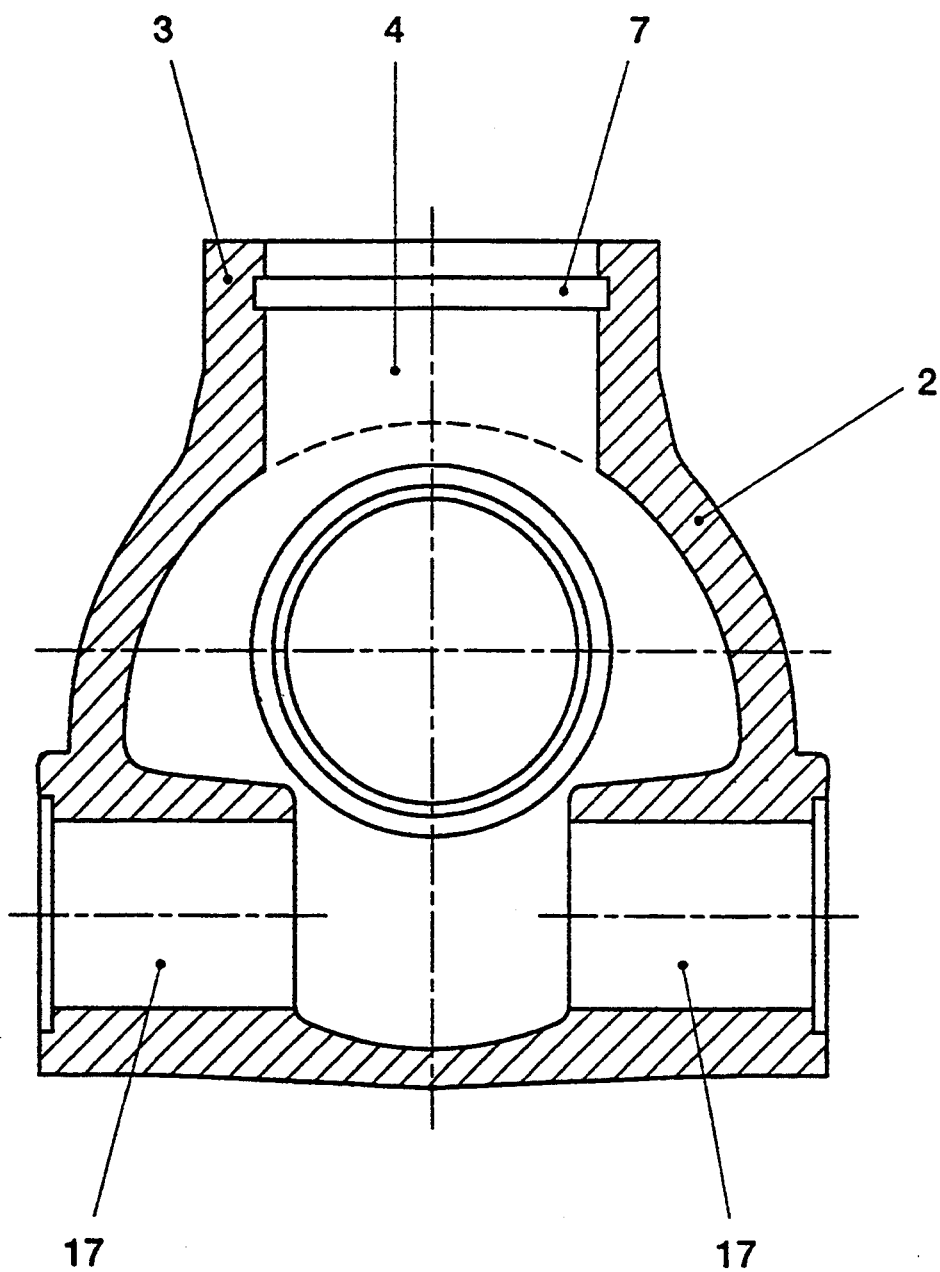
FIG. 2 shows a section A—A through the housing body of the quick-action flap of FIG. 1.

A detachable seating ring 10 is inserted in the housing body 2 in the region in front of the connecting mouthpiece 8. This seating ring 10 is used as a seal seating for a flap plate 11. The respective contact surfaces of the seating ring 10 and the flap plate 11 are armoured by means of hard-metal deposits. The flap plate 11 is shown only partially sectioned here. The flap plate 11 has a stem 12 acting as a stop and, in the open position shown of the quick-action flap 1, the stem 12 is in contact with a stop 13 cast onto the housing body 2 so that the lift of the flap plate 11 is limited. The flap plate 11 is supported by means of a pin 14 so that it can be moved to a small extent in a lever 15. The lever 15 is rigidly connected to a driven shaft 16. The shaft 16 is supported in two bearing positions 17 machined into the housing body 2. The configuration of the bearing positions 17 can be seen from FIG. 2. The bearing positions 17 are configured in such a way that the spherical shape of the housing body 2 is disturbed to the smallest extent possible.

The housing body 2, like the lever 15, is cast from a heat-resistant martensitic steel with a chromium proportion of 10%. This steel is designated as G-X12CrMoWVNbN 10 1 1 and is composed of the following important constituents:

| C  | 0.10 to 0.14   | percentage by weight; |
|----|----------------|----------------------|
| Si | 0.20 to 0.50   | percentage by weight; |
| Mn | 0.40 to 0.80   | percentage by weight; |
| P  | max. 0.020     | percentage by weight; |
| S  | max. 0.010     | percentage by weight; |
| Cr | 10.0 to 11.0   | percentage by weight; |
| Ni | 0.80 to 1.00   | percentage by weight; |
| Mo | 0.95 to 1.05   | percentage by weight; |
| W  | 0.95 to 1.05   | percentage by weight; |
| V  | 0.20 to 0.25   | percentage by weight; |
| Nb | 0.06 to 0.10   | percentage by weight; |
| N  | 0.045 to 0.053 | percentage by weight; |
| Ti | max. 0.005     | percentage by weight; |
| Cu | max. 0.10      | percentage by weight; |
| Al | max. 0.02      | percentage by weight; |
| B  | max. 5 ppm.    |                      |

The seating ring 10, the flap plate 11 and the shaft 16 are manufactured from a forgeable heat-resistant martensitic steel which is designated as X12CrMoNiVNbN 10 1 1. This steel is composed of the following important constituents:

| C  | 0.11 to 0.13   | percentage by weight; |
|----|----------------|----------------------|
| Si | 0.08 to 0.15   | percentage by weight; |
| Mn | 0.40 to 0.50   | percentage by weight; |
| P  | max. 0.010     | percentage by weight; |
| S  | max. 0.005     | percentage by weight; |
| Cr | 10.2 to 10.8   | percentage by weight; |
| Ni | 0.70 to 0.80   | percentage by weight; |
| Mo | 1.02 to 1.10   | percentage by weight; |
| W  | 0.80 to 0.95   | percentage by weight; |
| V  | 0.17 to 0.22   | percentage by weight; |
| Nb | 0.04 to 0.06   | percentage by weight; |
| N  | 0.045 to 0.060 | percentage by weight; |
| Ti | max. 0.001     | percentage by weight; |
| Cu | max. 0.05      | percentage by weight; |
| Al | max. 0.010     | percentage by weight; |
| As | max. 0.012     | percentage by weight; |
| Sb | max. 0.0012    | percentage by weight; |
| Sn | max. 0.007     | percentage by weight; |

-continued

| B | max. 5 ppm. |
|---|-------------|

The use of these two types of steel, which are similar particularly with respect to temperature resistance, permits a further increase, relative to conventional quick-action flaps, in the temperature of the hot steam flowing through the quick-action flap 1 and an associated advantageous increase in the efficiency of the complete turbine arrangement.

Figure 3:
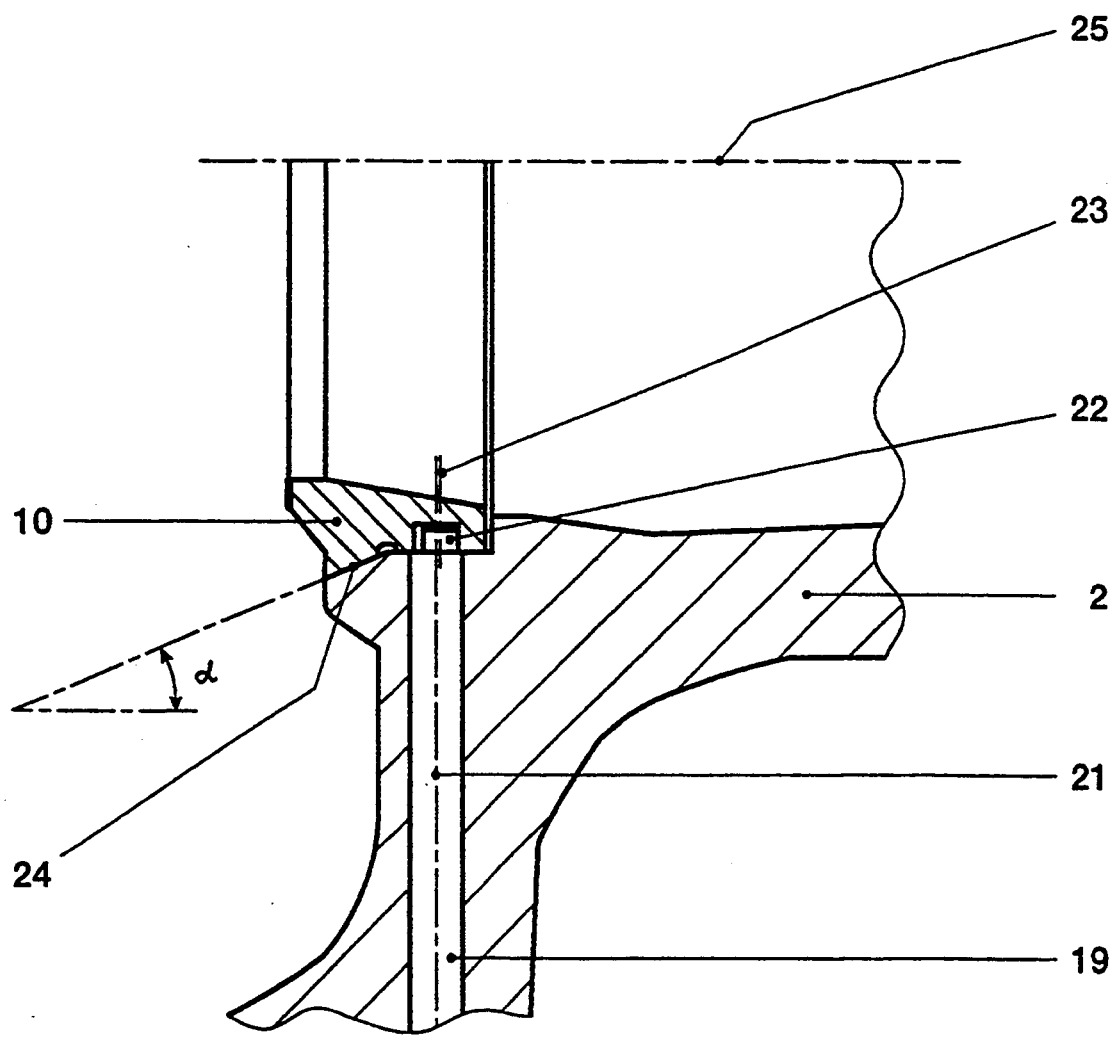
FIG. 3 shows a partial section through the quick-action flap of FIG. 1.

The seating ring 10 is positioned by means of pins 19 engaging in recesses 18 in the seating ring 10. The recesses 18 can be let individually into the housing body 2 but they can also, as shown here, be configured as a channel running round the seating ring 10. As a rule, three such pins 19 distributed over the periphery may be provided but two mutually opposite pins 19 may suffice. The pins 19 are each held by a flange 20 screwed to the housing body 2 and accommodating the head of the pin 19 as a form fit. A partial section through the housing body 2 is shown in FIG. 3 and this shows, inter alia, the cylindrically configured stem of the pin 19 and its center line 21. The tip of the pin 19 is provided with a cylindrically configured extension 22 center line 23 is arranged offset to the center line 21 of the pin 19. The extension 22 engages in the recess 18 in the seating ring 10 and, specifically, in such a way that the seating ring 10 is pressed in the axial direction onto its seat during fitting by means of a rotation of the pin 19 and in such a way that, when being removed, the seating ring 10 is released from its seat by a rotation in the opposite direction.

The seating ring 10 has a seating surface 24 configured as a part of a conical outer surface and this seating surface 24 is in contact with a correspondingly configured surface machined into the housing body 2. The seating ring 10 has a center line 25. The seating surface 24 is inclined at an angle $\alpha$ relative to the center line 25, as may be seen from FIG. 3. The angle $\alpha$ is in the range between 20° and 35° and is preferably embodied at 27°. This conically configured seat is always laid out in such a way that it is not self-locking so that fitting and removal of the seating ring 10 are facilitated.

Figure 4:
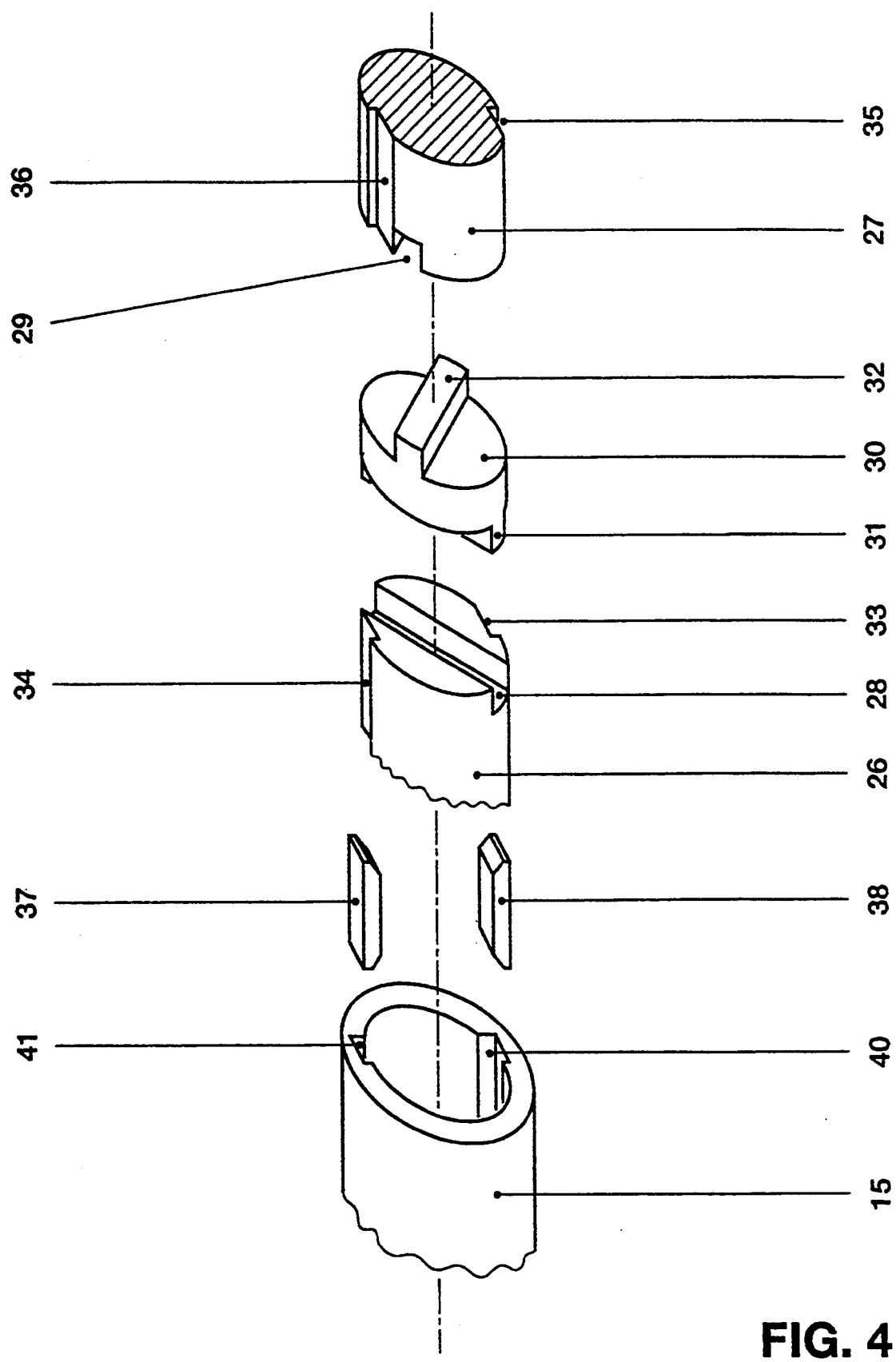
FIG. 4 shows a diagrammatic exploded view of a shaft provided with an Oldham disk.

As an additional safety measure against long-term jamming, the shaft 16 is provided in the region between the at least two bearing positions with a coupling which compensates for center line offset and angular differences. An Oldham disk, for example, is provided as the coupling—as is shown in FIG. 4. The two shaft ends 26, 27 have grooves 28, 29 on their respective end surfaces. An intermediate piece 30, which is configured in the form of a disk and is arranged between the shaft ends 26, 27, has wedges 31, 32 formed on its end surfaces. These wedges 31, 32 have a form fit in the grooves 28, 29 of the shaft ends 26, 27. The wedges 31, 32 are arranged offset by 90° relative to one another. The shaft ends 26, 27 are provided with recesses 33, 34, 35, 36 into which wedges 37, 38 are inserted. These wedges 37, 38 are held in position by means of the lever 15 which is configured to fit the wedges 37, 38 and is pushed over them. The lever 15 is provided with grooves 40, 41 for accommodating the wedges 37, 38. The mode of operation of this coupling is assumed to be known.

The drawing is now considered in somewhat more detail for further explanation of the mode of operation. In this quick-action flap 1, the support for the flap plate 11 is provided in a region which is not subjected to additional stresses because of the inhomogeneities in the housing body 2 caused by the service opening 4. Deformation of the housing body 2 in this region, which could lead to long-term jamming of the shaft 16, is avoided by this means. In the event of further increases in the requirements for the correct alignment of the center lines of the two bearing positions 17, the shaft 16 can be additionally provided in the region between the two bearing positions 17 with a coupling which compensates for center line offset and angular differences so that compensation is provided for deformation occurring to the bearing positions 17.

Obviously, numerous modifications and variations of the present invention are possible in light of the above teachings. It is therefore to be understood that within the scope of the appended claims, the invention may be practiced otherwise than as specifically described herein.

| LIST OF DESIGNATIONS | |
|---|---|
| 1 | Quick-action flap |
| 2 | Housing body |
| 3 | Mouthpiece |
| 4 | Service opening |
| 5 | Closing cover |
| 6 | Ring |
| 7 | Recess |
| 8, 9 | Connecting mouthpieces |
| 10 | Seating ring |
| 11 | Flap plate |
| 12 | Stem |
| 13 | Stop |
| 14 | Pin |
| 15 | Lever |
| 16 | Shaft |
| 17 | Bearing position |
| 18 | Recesses |
| 19 | Pin |
| 20 | Flange |
| 21 | Center line |
| 22 | Extension |
| 23 | Center line |
| 24 | Seating surface |
| 25 | Center line |
| 26, 27 | Shaft ends |
| 28, 29 | Grooves |
| 30 | Intermediate piece |
| 31, 32 | Wedges |
| 33, 34, 35, 36 | Recesses |
| 37, 38 | Wedges |
| 40, 41 | Grooves |

What is claimed as new and desired to be secured by Letters Patent of the United States is:

1. A quick-action flap, having a housing body, having a service opening let into the housing body, having at least two bearing positions for a driven shaft, which bearing positions are machined into the housing body and are arranged outside the service opening region which causes inhomogeneous stress distributions in the housing body, and having a flap plate which is fastened on the shaft, is pivotable about the center line of the shaft and interacts with a detachable seating ring, wherein the shaft is provided in the region between the at least two bearing positions with a coupling which compensates for center line offset and angular differences.

2. The quick-action flap as claimed in claim 1, wherein the housing body has a spherical configuration.

3. The quick-action flap as claimed in claim 1, wherein the housing body is cast from a heat-resistant martensitic steel with a chromium proportion of 10%, and wherein the seating ring is forged from a forgeable heat-resistant martensitic steel with a chromium proportion of 10%.

4. The quick-action flap as claimed in claim 1, wherein the seating ring is positioned by means of at least two pins engaging in recesses in the seating ring, and wherein the at least two pins are configured so as to be eccentric in the region in which they protrude into the recesses so that, when the pins are rotated, the seating ring is pressed in one of its axial directions depending on the particular direction of rotation.

5. The quick-action flap as claimed in claim 1, wherein the seating ring is seated in the housing body by means of a conically configured seat, and wherein this conically configured seat is not self-locking.

6. The quick-action flap as claimed in claim 5, wherein the seating surface of the conically configured seat is inclined by an angle $\alpha$ relative to the center line of the seating ring, the angle $\alpha$ being in the range between 20° and 35° but being preferably embodied at 27°.

7. The quick-action flap as claimed in claim 1, wherein said coupling is provided by an Oldham disk.

* * * * *